(12) United States Patent
Meszlenyi

(10) Patent No.: US 8,040,694 B2
(45) Date of Patent: Oct. 18, 2011

(54) SPIKE CONVERTER

(76) Inventor: Ivan Meszlenyi, Toronto (CA)

( * ) Notice: Subject to any disclaimer, the term of this patent is extended or adjusted under 35 U.S.C. 154(b) by 0 days.

(21) Appl. No.: 11/979,090

(22) Filed: Oct. 31, 2007

(65) Prior Publication Data

US 2008/0117655 A1    May 22, 2008

(51) Int. Cl.
   *H02M 7/00* (2006.01)
(52) U.S. Cl. .......................... 363/13; 323/206
(58) Field of Classification Search ............ 363/13; 323/206
   See application file for complete search history.

(56) References Cited

U.S. PATENT DOCUMENTS

| | | | |
|---|---|---|---|
| 7,209,371 B2* | 4/2007 | Odell et al. | 363/21.01 |
| 7,787,264 B2* | 8/2010 | Yang et al. | 363/21.06 |
| 2004/0037094 A1* | 2/2004 | Muegge et al. | 363/21.16 |
| 2007/0008749 A1* | 1/2007 | Baurle et al. | 363/21.12 |
| 2008/0117655 A1* | 5/2008 | Meszlenyi | 363/21.12 |
| 2008/0304187 A1* | 12/2008 | Balakrishnan et al. | 361/18 |
| 2008/0310203 A1* | 12/2008 | Yang et al. | 363/126 |
| 2009/0135628 A1* | 5/2009 | Ye et al. | 363/21.04 |
| 2009/0267577 A1* | 10/2009 | Hsu | 323/268 |
| 2010/0033991 A1* | 2/2010 | Huang et al. | 363/16 |
| 2010/0066337 A1* | 3/2010 | Gong et al. | 323/285 |
| 2010/0202163 A1* | 8/2010 | Yang et al. | 363/21.12 |
| 2010/0214807 A1* | 8/2010 | Li | 363/26 |
| 2010/0225293 A1* | 9/2010 | Wang et al. | 323/290 |
| 2010/0232183 A1* | 9/2010 | Yang | 363/21.02 |
| 2010/0254166 A1* | 10/2010 | Djenguerian et al. | 363/21.12 |
| 2010/0277002 A1* | 11/2010 | Folts et al. | 307/82 |

* cited by examiner

*Primary Examiner* — Lincoln Donovan
*Assistant Examiner* — Adam D Houston

(57) ABSTRACT

The present invention is a spike converter providing a special mode of operation of a low power fly-back converter in a very narrow duty cycle range in particular. This spike operation minimizes the size of the required reactive components such as that of the power transformer and output capacitance. The present invention automatically achieves low idle power consumption due to the nature of the feedback under fixed, narrow duty cycle or spike operation. The spike operation is defined by the lower limit of the on time of the switching element being generated by the sum of the propagation delays of a current sense comparator and an off time pulse generating comparator.

8 Claims, 2 Drawing Sheets

SPIKE CONVERTER

BACKGROUND OF THE INVENTION

1. Field of the Invention

The present invention generally relates to power converters. Specifically, the present invention relates to power converters for applications where power requirements are on the order of a few watts. More specifically, the present invention relates to those power converters having a universal input voltage range and needing to meet the requirements of "green" power, very low power consumption, under light load conditions.

2. Description of the Prior Art

Prior art embodiments customarily use a light or no load detection system by sensing one of the parameters related to loading and then initiating burst mode operation to reduce standby power and to increase light load efficiency. One such embodiment is a method whereby a comparator is used to monitor a feedback voltage relative to a reference level which, if exceeded, causes a burst mode block to be activated in order to keep idle power consumption low. Customarily, the starting point of a prior art converter design is to set the duty cycle around 50% for low line full load conditions which unnecessarily increases the size and cost of the components and thus the converter for low power applications.

SUMMARY OF THE INVENTION

The present invention exploits the advantages of spike mode operation which is essentially a very low duty cycle mode of operation of a fly-back converter with automatic pulse skipping mode resulting in significant size and cost reduction of the reactive components such as the power transformer the output capacitance as well as the de-rating of the switching element. The present invention provides a highly efficient power converter for low power applications. Its low duty cycle allows the converter to function at a lower frequency while retaining the benefit of high frequency operation in the selection of transformer where the transformer size can be reduced to those used at frequencies several times greater than here employed. Additionally, the low duty cycle permits the reduction of the voltage rating of the switching element, typically a MOSFET, by approximately 20% and the current rating of the output rectifier reducing size and cost over prior art embodiments. Further, the present invention is practical for low power applications such as mobile phone chargers wherein reduced size, cost, and idle power consumption are desirable thus providing a superior alternative to the prior art.

DETAILED DESCRIPTION OF THE PREFERRED EMBODIMENT

Figure 1:
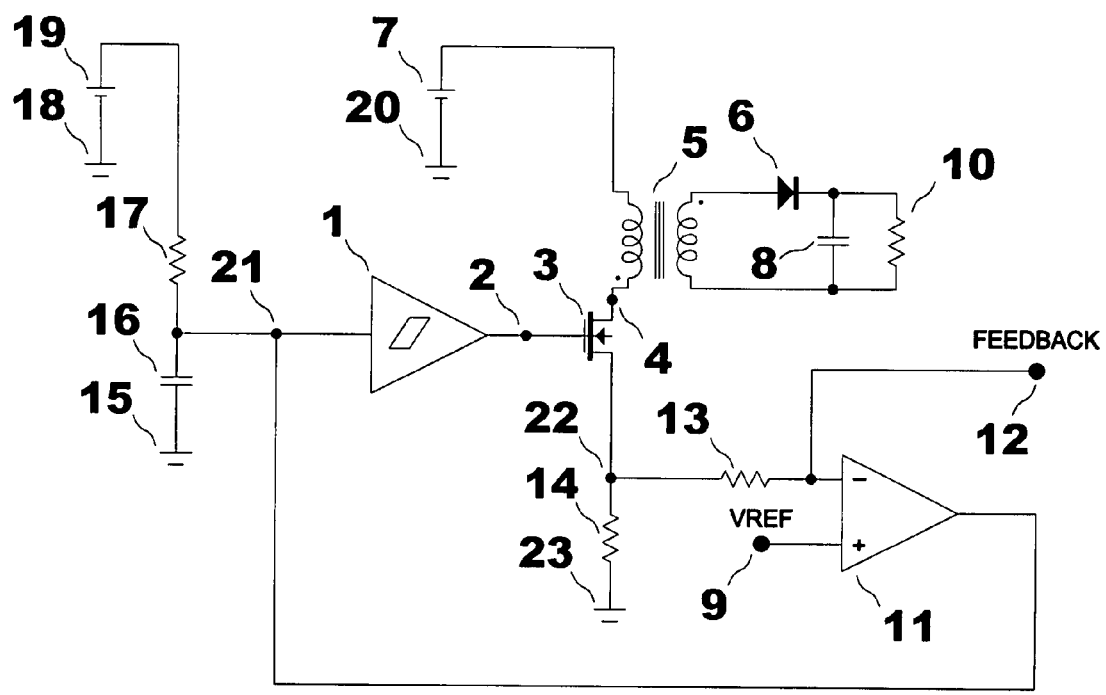
FIG. 1 is a schematic diagram of the preferred embodiment of the present invention.
Figure 2:
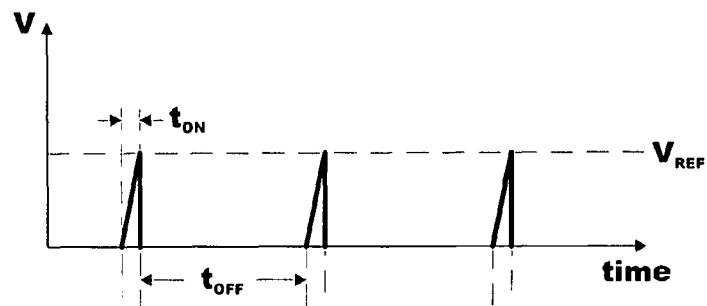
FIG. 2 is an illustration of a voltage waveform developed under operation at one of the junction points referenced in FIG. 1 essential to the understanding of the present invention.
Figure 3:
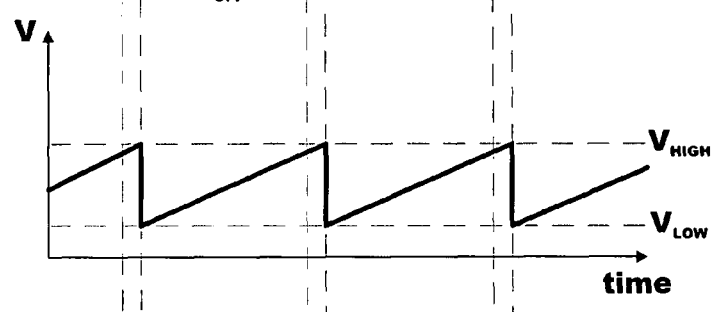
FIG. 3 is another illustration of a voltage waveform developed under operation at one of the junction points referenced in FIG. 1 essential to the understanding of the present invention.

In order to better understand the embodiment of the present invention, a spike converter will be described with reference to FIG. 1 and corresponding waveforms in FIGS. 2 through 6. One terminal of a timing capacitor 16 is connected to a timing resistor 17 as in FIG. 1. The junction of said timing capacitor 16 and timing resistor 17 is further connected to the input of a comparator with hysteresis 1 and the output of a current sense comparator 11. A waveform as in FIG. 3 is developed at junction point 21. The other terminal of said timing resistor 17 is connected to the positive terminal of a bias supply 19 and the other terminal of said timing capacitor 16 is connected to the common ground 15. Ground points 15, 18, 20 and 23 represent a common point and are only separated for the purposes of this illustration. The negative terminal of bias supply 19 is connected to common ground 18.

Figure 4:
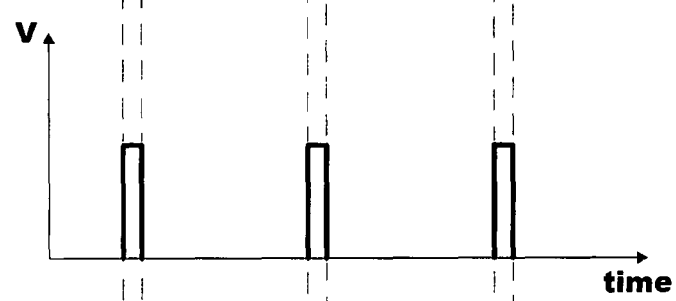
FIG. 4 is yet another illustration of a voltage waveform developed under operation at one of the junction points referenced in FIG. 1 essential to the understanding of the present invention.
Figure 5:
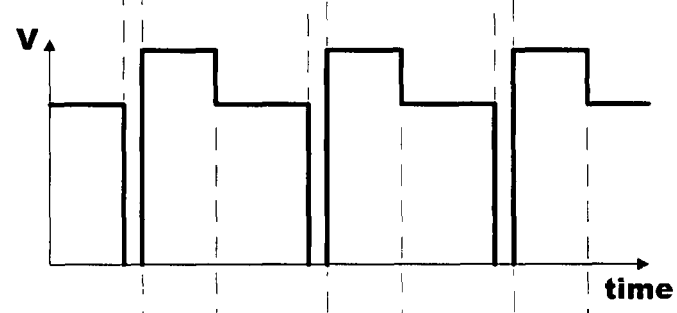
FIG. 5 is yet another illustration of a voltage waveform developed under operation at one of the junction points referenced in FIG. 1 essential to the understanding of the present invention.

The output of the comparator with hysteresis 1 is connected to the input terminal of a switching element 3, such as a MOSFET, forming the junction point 2 where a waveform as in FIG. 4 is developed. The drain terminal of switching element 3 is connected to a terminal of the primary winding of transformer 5 forming junction point 4 where a waveform as in FIG. 5 is developed. The other terminal of said primary winding of transformer 5 is connected to the positive terminal of the converter's DC power source 7, a power source typically derived from rectified and filtered AC mains. The negative terminal of said DC power source 7 is connected to common ground 20.

The source terminal of switching element 3 is connected to a terminal of sensing resistor 14 and the a terminal of a current sample feed resistor 13 forming junction point 22. A waveform as in FIG. 2 is developed at junction point 22. The remaining terminal of said current sample feed resistor 13 is connected to the negative input of current sense comparator 11 forming feedback point 12. The remaining terminal of sensing resistor 14 is connected to common ground 23. The positive input of said current sense comparator 11 forms voltage reference point 9.

Figure 6:
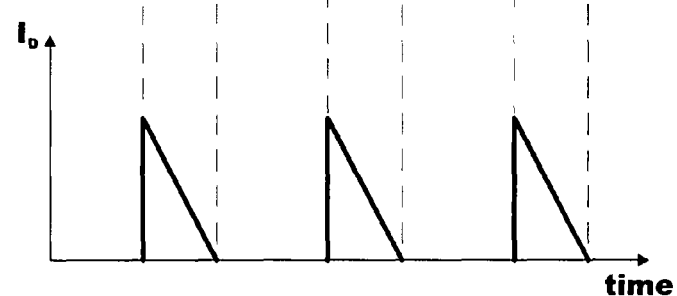
FIG. 6 is an illustration of a current waveform developed under operation at one of the junction points referenced in FIG. 1 essential to the understanding of the present invention.

A terminal of the secondary winding of transformer 5 is connected to a terminal of output capacitor 8 and a terminal of load 10 forming the negative output of the converter. The remaining terminal of the secondary winding of transformer 5 is connected the anode of rectifier 6. The cathode of said rectifier 6 is connected to the remaining terminals of output capacitor 8 and load 10 forming the positive output of the converter. A current waveform as in FIG. 6 is developed across rectifier 6.

The operation of the spike converter will be described with reference to FIG. 1 and corresponding waveforms in FIGS. 2 and 3. Under full load and low line condition, the voltage at the gate terminal of switching element 3 remains zero until the voltage across timing capacitor 16 reaches the high threshold of comparator with hysteresis 1. Once the high threshold of comparator with hysteresis 1 is attained, the switching element 3 is turned on and current ramps up with slope V/L where V is the supply voltage and L is the inductance of the primary winding of transformer 5. Once the ramp across the sensing resistor 14 reaches the reference voltage as depicted by the $V_{REF}$ line in FIG. 2, current sense comparator 11 will discharge timing capacitor 16 to the low threshold of comparator with hysteresis 1 causing this cycle to begin again. The off time of the converter, as depicted by the duration of $t_{OFF}$ in FIG. 2, is defined by the charge time of timing capacitor 16 via timing resistor 17 from $V_{LOW}$ to $V_{HIGH}$, as depicted by FIG. 3.

Since the on time of the converter, as depicted by the duration of $t_{ON}$ in FIG. 2, is very brief relative to the off time of the converter, the current feedback provides excellent line regulation at full load.

At light load, the feedback is used to lower the current ramp threshold to reduce the average power. At some point under light load condition, the converter will enter into small duty cycle mode where the lower limit of the on time is defined by the sum of the propagation delays of the comparators 1 and 11. At this point, the current will only ramp. up to the value it reaches within the aforesaid time delay and the feedback voltage on the negative input of current sense comparator 11 will exceed the reference voltage for much of the off time resulting in an extremely low duty cycle that allows the converter to meet "green" power specifications.

I claim as my invention:

1. A spike converter comprising:
   (a) a DC bias supply having a positive and negative electrode where the negative terminal is connected to the common ground of the circuit;
   (b) the positive terminal of said DC bias supply connected to one terminal of a timing resistor;
   (c) the other terminal of said timing resistor connected to one terminal of a timing capacitor and the input of a comparator with hysteresis and the output of a current sense comparator;
   (d) the other terminal of said timing capacitor connected to said common ground;
   (e) the output of said comparator with hysteresis connected to the gate terminal of a switching element, such as a MOSFET;
   (f) the source terminal of said switching element connected to one terminal of a sensing resistor and one terminal of a current sample feed resistor;
   (f) the other terminal of said sensing resistor connected to said common ground;
   (g) the other terminal of said current sample feed resistor connected to the negative input of the current sense comparator forming the feedback point of the converter;
   (h) the positive terminal of said current sense comparator forming the voltage reference point of the converter;
   (i) the drain terminal of said switching element connected to one terminal of the primary winding of a transformer;
   (j) said transformer having a primary and secondary winding;
   (k) the other terminal of said primary winding of said transformer connected to the positive terminal of the converter's DC power source;
   (l) the negative terminal of the converter's DC power source connected to said common ground;
   (m) one terminal of the secondary winding of said transformer connected to the anode of an output rectifier;
   (n) the cathode of said output rectifier forming the positive output of the converter;
   (o) the other terminal of said secondary winding of said transformer forming the negative output of the converter;
   (p) an output capacitor connected between said positive and negative output terminals;
   (q) an output load in parallel with said output capacitor.

2. A spike converter as in claim 1, wherein said current sense comparator has an output substantially opened when the positive input is higher than the negative input.

3. A spike converter as in claim 1, wherein the off time of said switching element is determined by said timing resistor and said timing capacitor.

4. A spike converter as in claim 1, wherein the on time of said switching element is determined by the amount of time it takes the current slope in said current sense resistor to reach the value defined by said voltage reference and said feedback.

5. A spike converter as in claim 1, wherein the on time of said switching element is substantially smaller than the off time thereby reducing said transformer and output capacitor rating requirements and therefore size.

6. A spike converter as in claim 1, wherein the on time of said switching element is substantially smaller than the off time keeping the reflected voltage on the switching element low and thereby reducing the required voltage handling capacity of same.

7. A spike converter as in claim 1, wherein the lower limit of the on time of said switching element is defined by the sum of the propagation delays of said comparator with hysteresis and said current sense comparator whereby said feedback forces the converter to enter into pulse skipping mode under light conditions.

8. A spike converter as in claim 7, wherein said pulse skipping mode causes the converter to consume very little power under said light load conditions.

\* \* \* \* \*